United States Patent
Dickinson et al.

(10) Patent No.: US 9,110,534 B2
(45) Date of Patent: Aug. 18, 2015

(54) STYLUS DEVICES HAVING VARIABLE ELECTRICAL CHARACTERISTICS FOR CAPACITIVE TOUCHSCREENS

(75) Inventors: Timothy A Dickinson, Crystal Lake, IL (US); Roger L Franz, Mundelein, IL (US); John H Krahenbuhl, McHenry, IL (US); Jiri Slaby, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 532 days.

(21) Appl. No.: 12/773,461

(22) Filed: May 4, 2010

(65) Prior Publication Data

US 2011/0273376 A1 Nov. 10, 2011

(51) Int. Cl.
G06F 3/033 (2013.01)
G06F 3/041 (2006.01)
G06F 3/0354 (2013.01)
G06F 3/039 (2013.01)

(52) U.S. Cl.
CPC .............. *G06F 3/0416* (2013.01); *G06F 3/039* (2013.01); *G06F 3/03545* (2013.01)

(58) Field of Classification Search
CPC .... G06F 3/03545; G06F 3/039; G06F 3/0416
USPC ......................... 345/179, 174, 173
See application file for complete search history.

(56) References Cited

U.S. PATENT DOCUMENTS

| | | |
|---|---|---|
| 4,139,854 A | 2/1979 | Walker |
| 5,914,708 A * | 6/1999 | LaGrange et al. ............ 345/179 |
| 5,945,980 A | 8/1999 | Moissev et al. |
| 5,956,020 A | 9/1999 | Amico et al. |
| 6,729,547 B1 | 5/2004 | Charlier et al. |

(Continued)

FOREIGN PATENT DOCUMENTS

| | | |
|---|---|---|
| EP | 1993025 A2 | 11/2008 |
| EP | 1993028 A1 | 11/2008 |

(Continued)

OTHER PUBLICATIONS

United States Patent and Trademark Office, "Non-Final Office Action" for U.S. Appl. No. 12/570,140, dated Feb. 17, 2012, 12 pages.

(Continued)

*Primary Examiner* — Quan-Zhen Wang
*Assistant Examiner* — Tony Davis
(74) *Attorney, Agent, or Firm* — Shumaker & Sieffert, P.A.

(57) ABSTRACT

Disclosed are devices and methods of stylus devices that when in contact with a capacitive touchscreen and a grounding element, can vary the signal level detected on a capacitive touchscreen to create a more realistic writing experience. Disclosed are elements of a touchscreen stylus, which individually or in combination, can enable a touchscreen stylus to have at least one electrical characteristic that is variable. In this way the resistive link between the touchscreen and a grounding element can be varied to enable features such as a capability to vary the width of line being drawn, to vary a region of influence on the touchscreen and/or to vary a temperament of action. The elements of a disclosed stylus can include at least one mechanical feature to provide at least one electrical characteristic that is variable and/or at least one material in an arrangement to provide at least one electrical characteristic that is variable.

18 Claims, 4 Drawing Sheets

(56) References Cited

U.S. PATENT DOCUMENTS

| | | | |
|---|---|---|---|
| 6,952,203 | B2 | 10/2005 | Banerjee et al. |
| 7,077,594 | B1 | 7/2006 | Annerino et al. |
| 7,567,242 | B2 | 7/2009 | Perkins et al. |
| 7,715,036 | B2 | 5/2010 | Silverbrook et al. |
| 2001/0006383 | A1* | 7/2001 | Fleck et al. ............ 345/179 |
| 2002/0080123 | A1 | 6/2002 | Kennedy et al. |
| 2007/0150842 | A1 | 6/2007 | Chaudhri et al. |
| 2007/0242056 | A1 | 10/2007 | Engelhardt et al. |
| 2008/0284743 | A1 | 11/2008 | Hsu et al. |
| 2008/0284753 | A1 | 11/2008 | Hsu et al. |
| 2009/0006991 | A1 | 1/2009 | Lindberg et al. |
| 2010/0051356 | A1* | 3/2010 | Stern et al. ............ 178/19.04 |
| 2010/0321338 | A1* | 12/2010 | Ely ............ 345/174 |
| 2011/0001708 | A1 | 1/2011 | Sleeman |
| 2011/0074701 | A1 | 3/2011 | Dickinson et al. |
| 2011/0187727 | A1 | 8/2011 | Ahn et al. |
| 2011/0273376 | A1 | 11/2011 | Dickinson et al. |
| 2011/0273378 | A1 | 11/2011 | Alameh et al. |
| 2011/0297457 | A1* | 12/2011 | Yeh et al. ............ 178/19.01 |

FOREIGN PATENT DOCUMENTS

| | | |
|---|---|---|
| WO | 20030065192 A1 | 8/2003 |
| WO | 2007122444 A1 | 11/2007 |

OTHER PUBLICATIONS

Alameh et al., "Active Styluses for Interacting with a Mobile Device" U.S. Appl. No. 13/307,962, filed Nov. 30, 2011, 61 pages.

Appleinsider, "Apple Looks to Improve Pen-Based Input on Tablet Touchscreens", Nov. 12, 2009, pp. 1-2, http://www.appleinsider.com/articles/09/11/12/apple_looks_to_improve_pen_based_input_on_tablet_touchscreens.html.

HTC Patents Capacitive Stylus, "HTC Patents Capacitive Stylus", Aug. 21, 2009, pp. 1-5, http://www.pocketpc-live.com/htc/htc-magnetic-stylus.html.

Ten One Design LLC, "The Classic Pogo Stylus", Pogo Stylus, 2010, pp. 1-17, http://www.tenonedesign.com/stylus.php.

PCT "Notification of Transmittal of the International Search Report and the Written Opinion of the International Searching Authority, or the Declaration", Dec. 1, 2010, pp. 1-14, PCT/US2010/048345, European Patent Office.

* cited by examiner

STYLUS DEVICES HAVING VARIABLE ELECTRICAL CHARACTERISTICS FOR CAPACITIVE TOUCHSCREENS

FIELD

Disclosed are methods and stylus devices having variable electrical characteristics that can vary the signal level detected on a capacitive touchscreen to create a more realistic writing experience.

BACKGROUND

Touchscreens are widely used as displays for electronic devices. A touchscreen enables a user to interact with that which is displayed directly, instead of indirectly by a mouse, touch pad or other input device. Touchscreens are used, for example, in mobile communication devices.

There are at least two main categories of touchscreens, such being resistive touchscreens and capacitive touchscreens. A resistive touchscreen includes several layers, two of which are electrically conductive layers separated by a narrow gap. When an object, such as a finger or stylus presses on the resistive touchscreen, the gap is closed so that a connection between those two electrically conductive layers is made. The contact between the two layers causes a change in the current which is registered as a touch event for processing.

A capacitive touchscreen includes an insulator layer such as glass that is coated with a transparent conductor such as indium tin oxide (ITO). Bringing a finger or conductive stylus within close proximity of the capacitive sensor changes the local electrostatic field. A user is grounded, therefore, the circuit of the touchscreen and the finger or conductive stylus is completed. The location of the one touch or multiple touches can be measured by a grid. A fine grid can provide high resolution of the capacitive touchscreen which makes a capacitive touchscreen a preferred touchscreen for smaller electronic devices.

DETAILED DESCRIPTION

Figure 1:
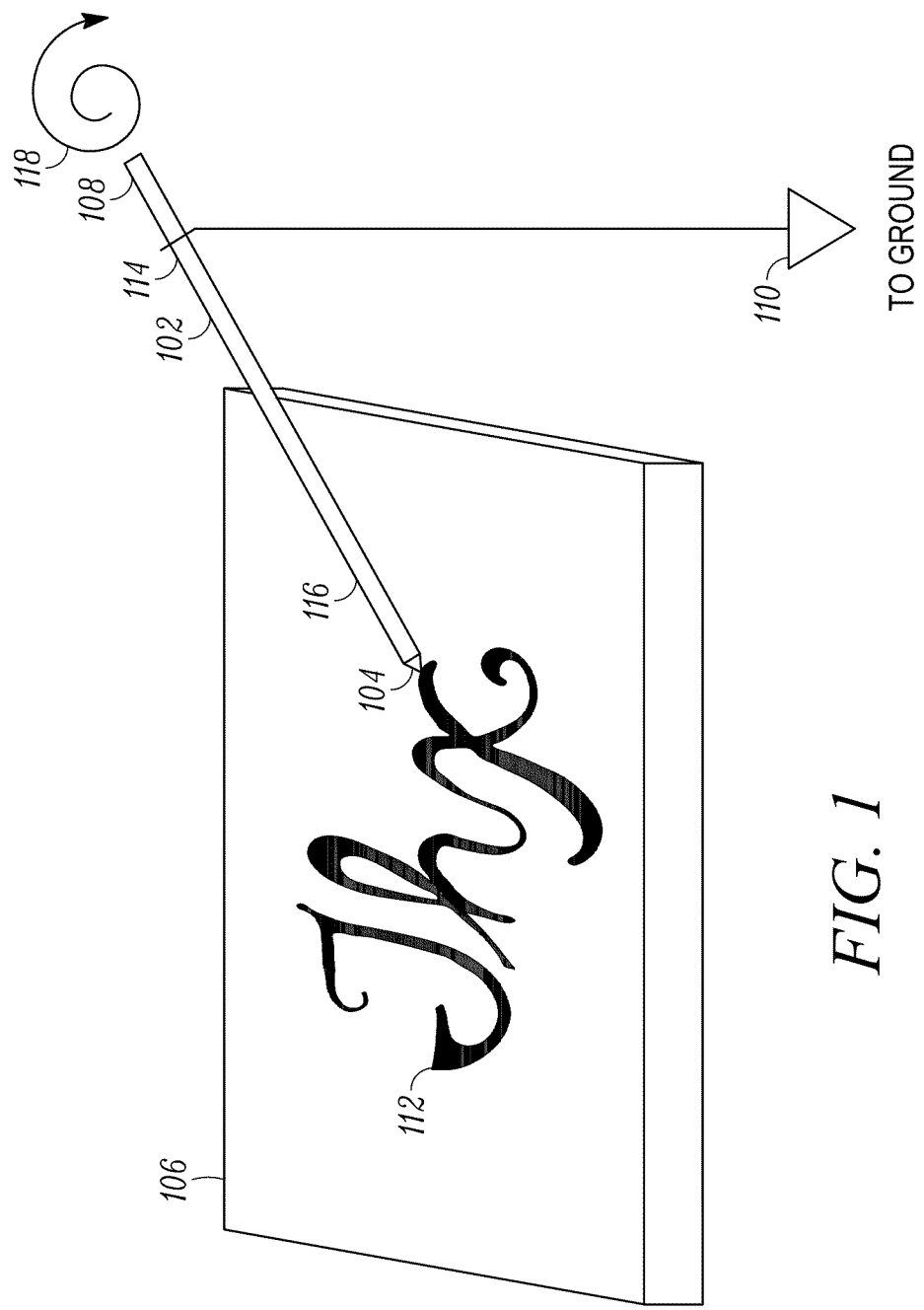
FIG. 1 depicts a stylus that is an elongate member having a first distal end configured for contact with a capacitive touchscreen, and also configured for contact with a grounding element.

For a user interface of a capacitive touchscreen of an electronic device for menu selection, a finger or a conductive stylus is adequate. However, fingers tend to leave oils on the surface of the touchscreen that can distort the information received via the electrostatic field. Accordingly, a conductive stylus or a pointed fingernail may be a preferable input device to a fingertip.

Even still, a conductive stylus or a pointed fingernail is not capable of controlling the thickness, stroke or swath detail of a line drawing on the touchscreen display. It may be beneficial were a stylus device to perform more like a physical pen and paper. For example, certain scripts depend upon thickness, stroke or swath detail. Moreover, as handwriting recognition algorithms become better able to distinguish handwritten user input, those scripts can be read as well. With thickness, stroke or swath control, a user can better personalize input to the device.

Disclosed are stylus devices and methods of stylus devices that when in contact with a capacitive touchscreen and a grounding element, can vary the signal level detected on a capacitive touchscreen to create a more realistic writing experience. The elements of a disclosed stylus can include at least one mechanical feature to provide at least one electrical characteristic that is variable and/or at least one material in an arrangement to provide at least one electrical characteristic that is variable.

In one embodiment the stylus can be rotated in a hand, much like a beveled edge on a marker to control the resistivity of the material along the body of the stylus. In another embodiment, depending where the user grips the stylus, their skin conductivity to the stylus can be different and thus there is an electrical method to vary the signal level that is placed onto the capacitive touchscreen. In this way, the user may use a disclosed stylus in a manner similar to that when writing with an actual pen and paper. For example, it may be natural to grip the pen closer to the tip when in the need of finer control. A disclosed variably conductive stylus includes a higher amount of resistance closer to the stylus tip and a lesser amount farther from the tip. Accordingly, as the user moves their grip upward on the stylus body the resistance is reduced to improve the conductivity which can create an electrically "blunt" input device.

Disclosed are elements of a touchscreen stylus, which individually or in combination, can enable a touchscreen stylus to have at least one electrical characteristic that is variable. In this way the resistive link between the touchscreen and a grounding element can be varied to enable features such as a capability to vary the width of line being drawn, to vary a region of influence on the touchscreen and/or to vary a temperament of action.

The larger the signal received by the capacitive display, the larger the area of the image created. That is more received signal can result in a wider line and less received signal can result in a thinner line. A user may control the conductivity or other electrical property by controlling where the user's skin touches the stylus. For example, coatings and/or insulators such as a rubber grip with contact slots, and/or variations in the texture of the surface of the stylus so as to reduce the skin contact area can allow the user to control the conductivity of other electrical property of the stylus. In another embodiment, a mechanical wiper within the stylus that acts as a potentiometer may provide control to a user. Sandwiching two materials of different levels of conductivity (one stronger, one weaker) can electrically create the beveled edge device. In any of the disclosed manners, and any combinations thereof, the disclosed stylus device can vary the signal level detected on a capacitive touchscreen to create a more realistic writing experience. A capacitive touch sensor would view the changes in signal level caused by the stylus and relate these changes to the user interface layer.

In one embodiment, a resistive link variation can be enabled depending on where the stylus is held. A combination of elements can include segmented/laminated/variable in axial construction to provide longitudinal variation; segments in resistor series to provide linear gradients; segments in series/parallel combinations to provide linear/non-linear profiles; rheostat-like resistor windings with one or more slidable indexing collars; and rheostat-like resistor windings with one or more screwable indexing collars. In another embodiment, additionally, or in the alternative to where the stylus is held, a resistive link variation can be enabled depending on how the stylus is held. A combination of elements can include, surface roughness elements which can include varying density and height to vary contact resistance, segmented/laminated in lengthwise construction to provide rotational variation and replaceable tips of varying geometry.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

FIG. 1 depicts a stylus that is an elongate member 102 having a first distal 104 end configured for contact with a capacitive touchscreen 106 and a second distal end 108 opposite the first distal end 104. The elongate member 102 has at least one electrical characteristic that is variable when the elongate member 102 is in contact with a capacitive touchscreen 106 and a grounding element 110. A variable electrical characteristic can be at least one of resistivity, conductivity, capacitivity, impedance and magnetism. In one embodiment, the base material is covered with a conductive rubberize coating or paint over conductive or non-conductive materials. The distal end 104, or of any elongate member described herein, can include a tip for contact with the capacitive touchscreen 106. In one example, the tip can be a compliant conductive rubber allowing for compression to create different areas of contact, and thus line width.

In one embodiment the grounding element 110 is a user. In another embodiment the grounding element 110 is another closed loop system. For example, the described stylus may be part of an electromechanical writing device.

As discussed above, it may be beneficial were a stylus device to perform more like a physical pen and paper. With thickness, stroke or swath control, a user can better personalize input to the device. The script 112 depicted upon the capacitive touchscreen 106 has varying thickness, stroke or swath. The image created by the script 112 on the capacitive touchscreen can be processed by a handwriting recognition algorithm, and/or can become a file or a portion of a file in and of its self. The file can be transferred in any suitable manner, for example, uploaded so that it can be sent to another device. In this way, a personalized message in a personal script can be transmitted. For example, the depicted script 112 says "Thx" which a user may wish to convey in a personal manner.

In one embodiment, when portions of the elongate member having different electrical properties are in series, and/or in any other disclosed stylus, a positioning of the grounding element 110, such as a user's grip, may provide control of the thickness stroke or swath. The grounding element 110 is shown in position 114. Were the position 114 of the grounding element 110 to move to position 116, or any other suitable position, the thickness, stroke or swath of a line made by the elongate member 102 upon the capacitive touchscreen 106 may be a different thickness. In one embodiment, the elongate member 102 can include a plurality of materials having different electrical properties as will be discussed in more detail below.

In another embodiment where portions of the elongate member 102 have different electrical properties that are in parallel, rotation of the elongate member 102 may provide the ability to change the thickness, stroke or swath of a line. For example, rotation 118 of the elongate member with respect to the capacitive display 106 is depicted. Rotation 118 can be for the orientation of the stylus 102, and/or for the grip of the user's hand. It is understood that the electrical characteristics of the stylus may be sensitive to various factors including elevation, orientation and/or the user's grip, including location and strength.

In another embodiment, different electrical properties may have a linear profile, for example from the first distal end 104 to the second distal end 108. In another embodiment different electrical properties may have a non-linear profile, for example from the first distal end 104 to the second distal end 108. A combination of linear and non-linear profiles is also contemplated.

As mentioned above, the element of an elongate member 102 can include one or more of at least one electrical characteristic that is variable, at least one mechanical feature to provide at least one electrical characteristic that is variable, and at least one material to provide at least one electrical characteristic that is variable. The variable electrical characteristics of the elongate member 102 can include at least one of one of resistivity, conductivity, capacivity, impedance and magnetism. It is understood that any change in the position and/or orientation of the ground 110 with respect to the elongate member 102 that can vary the electrical properties of the elongate member 102 is within the scope of this discussion.

Figure 2:
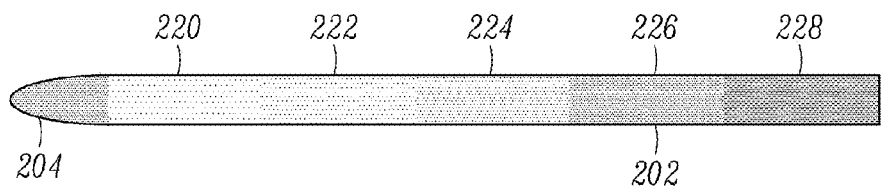
FIG. 2 depicts an embodiment of an elongate member that includes one or more electrical characteristics that is variable wherein portions of the elongate member have different electrical properties in series.

FIG. 2 depicts an embodiment of an elongate member 202 that includes one or more electrical characteristics that is variable wherein portions 220, 222, 224, 226 and 228 of the elongate member 202 have different electrical properties in series. For example, each portion 220, 222, 224, 226 and 228 may be made of materials with different resistivity.

Figure 3:
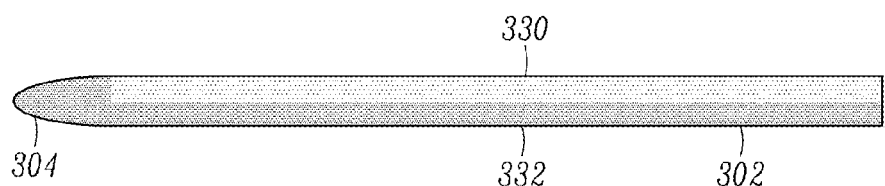
FIG. 3 depicts an embodiment of an elongate member that includes one or more electrical characteristics that is variable wherein portions of the elongate member have different electrical properties in parallel.

FIG. 3 depicts an embodiment of an elongate member 302 that includes one or more electrical characteristics that is variable wherein portions 330 and 332 of the elongate member 303 have different electrical properties in parallel. That is, the stylus may include two or more materials with different resistivity in its longitudinal direction to allow for different effects depending on what material resistivity is in contact with the capacitive touchscreen and how and/or where the user holds the stylus. For example, each portion 330 and 332 may be made of materials with different resistivity. Moreover, there may be any suitable number of parallel portions 330 and 332, and they may be made with a continuous material along the stylus length and/or they may be made with different doping zones in the longitudinal direction. A combination of series and parallel materials is also contemplated. Doping provides that a material with specific characteristics can be added in small controlled amounts to a basic material to alter its conductive properties.

Figure 4:
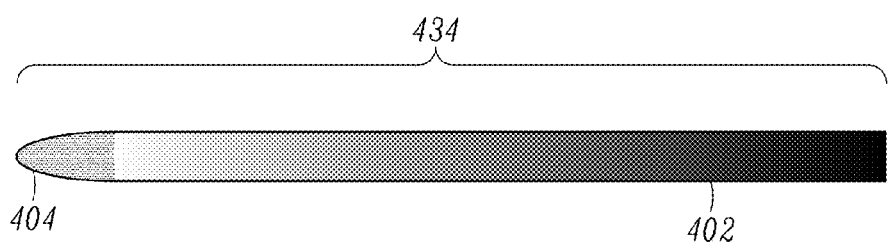
FIG. 4 depicts an embodiment of an elongate member that includes one or more electrical characteristics so that the length of the elongate member has a linear electrical property profile.

FIG. 4 depicts an embodiment of an elongate member 402 that includes one or more electrical characteristics so that the length 434 of the elongate member has a linear electrical property profile. The stylus 402 can be made of one or more material with electrical characteristics changing continuously from the tip 404 to any point along the length 434 of the elongate member 402. This may be achieved by doping a base material, coating, paint or other process, to allow for different sensitivity based on where and/or how the user holds the stylus.

Figure 5:
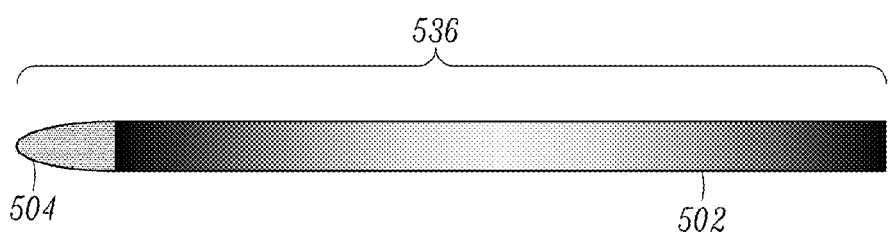
FIG. 5 depicts an embodiment of an elongate member that includes one or more electrical characteristics so that the length of the elongate member has a non-linear electrical property profile.

FIG. 5 depicts an embodiment of an elongate member 502 that includes one or more electrical characteristics so that the length 536 of the elongate member has a non-linear electrical property profile. In this example, the non-linear electrical property profile is axial but of course can include any non-linear profile such as radial or other.

It is further understood that the elongate member 102 or that shown in any of the figures need not be cylindrical or uniform. It may take on any suitable elongate shape. An elongate member 102 such as that shown in FIG. 1 may have shape designed in any suitable manner. Ergonomics designs may be combined with one or more desired variable electrical characteristic features.

Figure 6:
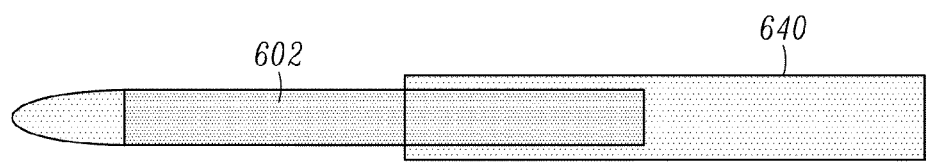
FIG. 6 depicts an embodiment of an elongate member has at least one mechanical feature to provide at least one electrical characteristic that is variable when the elongate member is in contact with a capacitive touchscreen and a grounding element.

FIG. 6 depicts an embodiment of an elongate member 602 and has at least one mechanical feature 640 to provide at least one electrical characteristic that is variable when the elongate member is in contact with a capacitive touchscreen and a grounding element. It is understood that any suitable mechanical feature that provides at least one electrical characteristic that is variable when the elongate member is in contact with a capacitive touchscreen and a grounding element is within the scope of this discussion. The depicted mechanical feature 640 is a collar about at least a portion of the length of the elongate member 602 that slides within the collar 640 to vary at least one electrical characteristic of the stylus. The reverse, of course can be true where the stylus forms the collar and a central member moves within the stylus collar. The position of the collar 640 can be maintained, for example, by friction.

Figure 7:
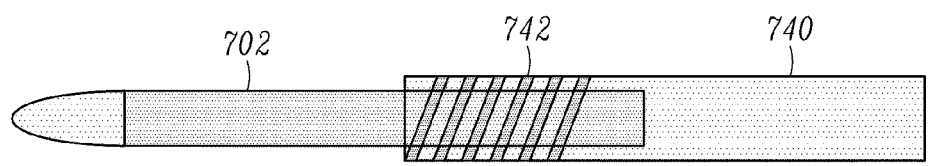
FIG. 7 depicts an embodiment of an elongate member that has at least one mechanical feature, in this example a collar, to provide at least one electrical characteristic that is variable when the elongate member is in contact with a capacitive touchscreen and a grounding element.

FIG. 7 depicts an embodiment of an elongate member 702 that has at least one mechanical feature 740, in this example a collar, to provide at least one electrical characteristic that is variable when the elongate member is in contact with a capacitive touchscreen and a grounding element. In this example, the collar 740 position can be maintained, for example, by rotation groves or thread 742. Moving the collar 740 with respect to the stylus 702 as a whole by rotation can vary at least one electrical characteristic of the stylus, such as its resistivity, conductivity, capacitivity, impedance and magnetism.

Figure 8:
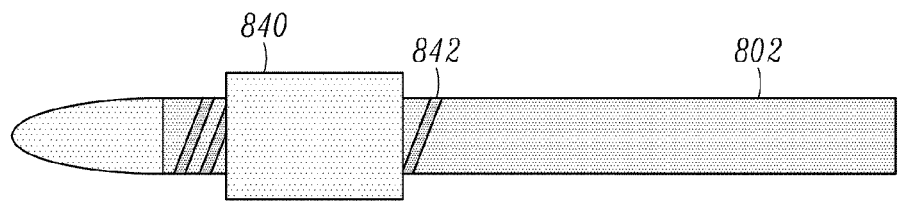
FIG. 8 depicts an embodiment of an elongate member that has at least one mechanical feature, in this example a type of collar, to provide at least one electrical characteristic that is variable when the elongate member is in contact with a capacitive touchscreen and a grounding element.

FIG. 8 depicts an embodiment of an elongate member 802 that has at least one mechanical feature 840, in this example another type of collar, to provide at least one electrical characteristic that is variable when the elongate member 802 is in contact with a capacitive touchscreen and a grounding element. In this example, the collar 840 position can be maintained, for example, by rotation groves or thread 842. Moving the collar 840 with respect to the stylus 802 as a whole by rotation can vary at least one electrical characteristic of the stylus.

Figure 9:
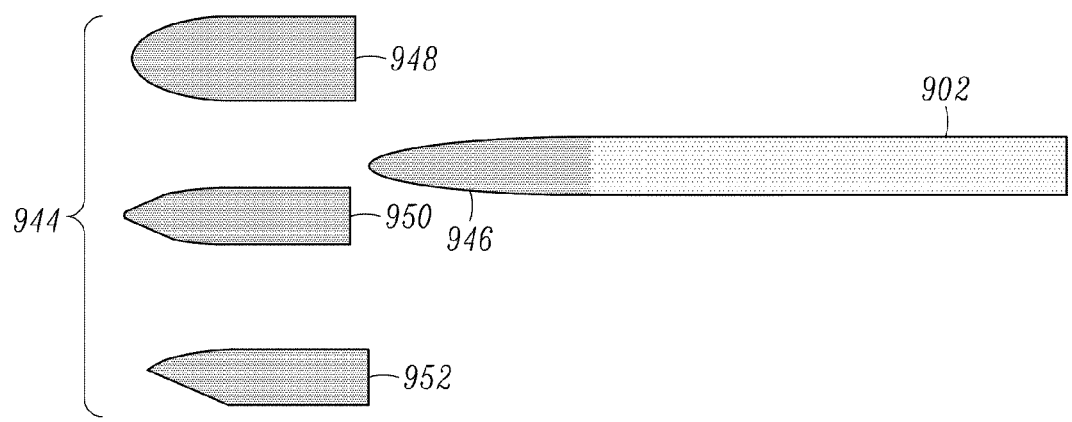
FIG. 9 depicts an embodiment of an elongate member that has at least one mechanical feature, in this example a plurality of replaceable tips of varying geometries for the elongate member to provide at least one electrical characteristic that is variable when the elongate member is in contact with a capacitive touchscreen and a grounding element.

FIG. 9 depicts an embodiment of an elongate member 902 that has at least one mechanical feature, in this example a plurality of replaceable tips 944 of varying geometries for the elongate member to provide at least one electrical characteristic that is variable when the elongate member 902 is in contact with a capacitive touchscreen and a grounding element. In any example, a tip 946 of the stylus 902 can varies its electrical properties based upon compression of the tip 946.

The plurality of tips 944 can of course be combined with other mechanical features, such as surface textures as well as material combinations to provide at least one electrical characteristic that is variable. In this example tips 946, 948, 950 and 952 have different geometries based on their size and configurations. For example, a tip may have a brush shape to provide a brush-like effect line width. A wider or narrower line may be dependent upon the pressure applied to the tip 946. It is understood that any suitable size, length and configuration is within the scope of this discussion. The composition of the tips can vary, for example, with respect to the type of fillers used for conductivity, the range of values of conductivity, variations in hardness and/or variations in colors.

Figure 10:
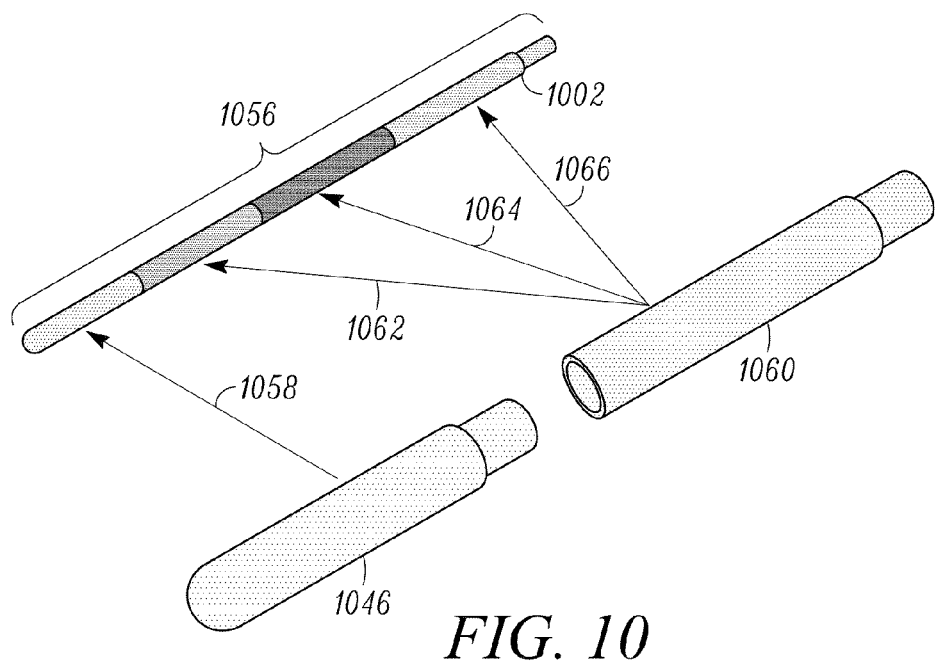
FIG. 10 depicts an embodiment of an elongate member that has at least one mechanical feature, in this example, modularity.

FIG. 10 depicts an embodiment of an elongate member 1002 that has at least one mechanical feature, in this example, modularity 1056. A tip 1046 may be part of the elongate member 1002 as illustrated by arrow 1058. Another modular piece 1060 may be part of the elongate member 1002 as illustrated by arrow 1062. Arrows 1064 and 1066 are illustrated to show that other portions of the elongate member 1002 may be fit together modularly. Different modular pieces 1056 of the stylus 1002, for example, may be made of different materials so that piecing them together and/or with other pieces can vary at least one electrical property when the elongate member 1002 is in contact with a capacitive touchscreen and a grounding element.

Figure 11:
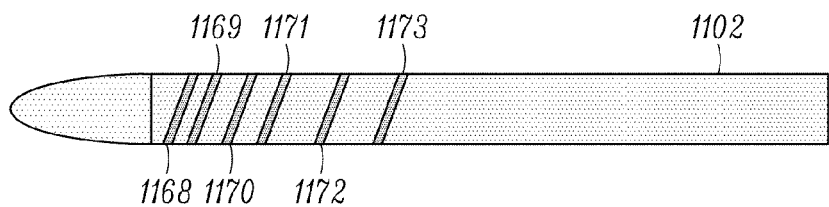
FIG. 11 depicts an embodiment of a stylus including a mechanical feature as a secondary part that includes a plurality of textures of a surface of the elongate member.

FIG. 11 depicts an embodiment of a stylus including a mechanical feature that includes a plurality of textures of a surface of the elongate member 1102. In this example, the elongate member may include any suitable number of stripes 1168, 1169, 1170, 1171, 1172 and 1173, for example, of resistive coatings and/or a second shot mold to vary resistance of the elongate member 1102. In addition, density of stripes can be used to vary electrical characteristics.

Figure 12:
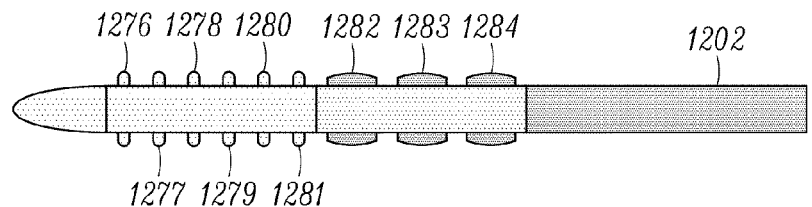
FIG. 12 depicts an embodiment of a stylus including a mechanical feature in the same part that includes a plurality of textures of a surface of the elongate member.

FIG. 12 depicts an embodiment of a stylus including a mechanical feature that includes a plurality of textures of a surface of the elongate member 1202. Zone shapes 1276, 1277, 1278, 1279, 1280, 1281, 1282, 1283 and/or 1284 can be any suitable shape, location and/or of any suitable material to provide at least one electrical characteristic that is variable when the elongate member is in contact with a capacitive touchscreen and a grounding element.

As mentioned above, the disclosed stylus can include at least one material to provide at least one electrical characteristic that is variable when the elongate member is in contact with a capacitive touchscreen and a grounding element wherein at least one electrical characteristic is one of resistivity, conductivity, capacity, impedance and magnetism. For example, an elongate member can include a plurality of materials having different electrical properties. The materials can include at least one of a plastic, an elastomer and a metal.

It is understood that electrical conductivities of metals can be selected according to composition. The disclosed stylus can be tailored based on to but not limited to the following metals, including alloys of the main constituent, in approximate order of decreasing conductivity: silver, copper, gold, aluminum, beryllium, brasses, bronzes, magnesium, zinc, nickel, steels, titanium.

It is understood that various plastics may be made electrically conductive or dissipative through selection of additives. Their physical properties such as hardness or color may be used to advantage in different embodiments of the disclosed stylus. Material may include for example, acrylonitrile butadiene styrene (ABS), polycarbonate (PC), polypropylene (PP), polyamide (PA), polybutylene terephthalate (PBT), polyphthalamide (PPA), polyphenylene sulfide (PPS), polyether ether ketone (PEEK), polyetherimide (PEI), polyamide-imide (PEI), polyoxymethylene (POM) also known as acetal, polymethylmethacrylate (PMMA) also known as acrylic.

It is understood that softer materials, such as elastomers can also be made electrically conductive or dissipative through selection of additives and may be used to advantage in different embodiments of the invention: silicones, silicone rubbers, thermoplastic polyurethane (TPU), thermoplastic elastomers (TPE), thermoplastic polyolefin elastomers (TEO).

It is further understood that conductive additives may be used as well. Such may be varied as to size, shape, and amount, and used to tailor the invention's electrical conductivity: carbon fiber, carbon black, carbon powder, graphite, stainless steel, nickel coated graphite fiber, inherently dissipative polymers (IDP), inherently conductive polymers (ICP), nano-materials including carbon nanotubes (CNT), and/or conductive inks for surface treatment.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiments were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A stylus comprising:
   a first distal end configured for contact with a capacitive touchscreen;
   a second distal end opposite the first distal end; and
   a housing comprising an arrangement of two or more materials that each have different electrical properties and provide the arrangement with at least one electrical characteristic that changes depending on a contact position of a grounding element along the arrangement, while the first distal end of the elongate member is in contact with the capacitive touchscreen.

2. The stylus of claim 1, wherein the at least one electrical characteristic is one of resistivity, conductivity, capacity, impedance, or magnetism.

3. The stylus of claim 1, wherein the grounding element is associated with a user.

4. The stylus of claim 1, wherein the arrangement comprises the two or more materials arranged in series.

5. The stylus of claim 1, wherein the arrangement comprises the two or more materials arranged in parallel.

6. The stylus of claim 1, wherein the arrangement comprises a linear or a non-linear electrical property profile.

7. The stylus of claim 1, wherein the arrangement comprises at least one mechanical feature of the elongate member that provides a surface from which a user can grip the elongate member to provide contact between the arrangement and the grounding element.

8. The stylus of claim 1, wherein the at least one electrical characteristic changes based on longitudinal or radial changes to the contact position of the grounding element along the portion of the elongate member.

9. A stylus comprising:
   an elongate member having:
      a first distal end configured for contact with a capacitive touchscreen;
      a second distal end opposite the first distal end; and
      a housing having at least one mechanical feature that is made from two or more materials that each have different electrical properties and provide the at least one mechanical feature with at least one electrical characteristic that changes depending on a contact position of a grounding element along the at least one mechanical feature while the first distal end of the elongate member contacts the capacitive touchscreen.

10. The stylus of claim 9, wherein the at least one electrical characteristic is one of resistivity, conductivity, capacity, impedance, or magnetism.

11. The stylus of claim 9, wherein the at least one mechanical feature, comprises a collar configured to slide about the housing of the elongate member.

12. The stylus of claim 9, wherein the at least one mechanical feature is a replaceable tip for the elongate member.

13. The stylus of claim 9, further comprising a tip having one or more electrical properties that change in value based on an amount of compression of the tip.

14. The stylus of claim 9, wherein the at least one mechanical feature, comprises:
   a collar within the elongate member; and
   a central member movable within the collar.

15. A stylus comprising:
   an elongate member having:
      a first distal end configured for contact with a capacitive touchscreen;
      a second distal end opposite the first distal end; and
      a portion made from two or more materials that each have different electrical properties and provide the portion with at least one electrical characteristic that changes depending on a contact position of a grounding element along the portion while the first distal end of the elongate member contacts the capacitive touchscreen.

16. The stylus of claim 15, wherein the at least one electrical characteristic is one of resistivity, conductivity, capacivity, impedance, or magnetism.

17. The stylus of claim 15, wherein the two or more materials comprise at least one of a plastic material, an elastomer material, and a metal material.

18. The stylus of claim 15, wherein the portion is at least one mechanical feature of the elongate member that provides a surface from which a user can grip the elongate member to provide contact between the portion and the grounding element.

* * * * *